(12) United States Patent
Ye et al.

(10) Patent No.: US 9,994,689 B2
(45) Date of Patent: Jun. 12, 2018

(54) METHOD FOR PREPARING HIGH-PERFORMANCE MELAMINE FOAM

(71) Applicant: Chengdu Yulong Chemical Co., Ltd., Chengdu (CN)

(72) Inventors: Rui Ye, Chengdu (CN); Lu Zhang, Chengdu (CN); Hang Gou, Chengdu (CN); Hua Su, Chengdu (CN); Hao Fu, Chengdu (CN)

( * ) Notice: Subject to any disclaimer, the term of this patent is extended or adjusted under 35 U.S.C. 154(b) by 0 days. days.

(21) Appl. No.: 15/681,324

(22) Filed: Aug. 18, 2017

(65) Prior Publication Data

US 2017/0342229 A1   Nov. 30, 2017

Related U.S. Application Data

(62) Division of application No. 15/001,243, filed on Jan. 20, 2016.

(30) Foreign Application Priority Data

May 7, 2015   (CN) .......................... 2015 1 0228178

(51) Int. Cl.
  *C08J 9/00* (2006.01)
  *C08J 9/04* (2006.01)
(52) U.S. Cl.
  CPC ............... *C08J 9/0014* (2013.01); *C08J 9/04* (2013.01); *C08J 2201/03* (2013.01); *C08J 2361/28* (2013.01)

(58) Field of Classification Search
  CPC ........ C08J 9/0014; C08J 9/04; C08J 2361/28; C08J 2201/03
  See application file for complete search history.

(56) References Cited

U.S. PATENT DOCUMENTS 9,663,625 B2 *   5/2017   Gross ...................... C08L 61/28

* cited by examiner

*Primary Examiner* — Kara B Boyle
(74) *Attorney, Agent, or Firm* — Wayne & Ken, LLC; Tony Hom

(57) ABSTRACT

The present disclosure relates to a method for preparing high-performance melamine foam, comprising the following steps: preparing a primary polymer of waterborne melamine formaldehyde resin; uniformly mixing the primary polymer of the waterborne melamine formaldehyde resin, the polar solvent, the surfactant and the additive to obtain a mixture A; uniformly mixing the mixture A with the solid methylol melamine to obtain a mixture B; uniformly mixing the mixture B with the foaming agent to obtain a mixture C; uniformly mixing the mixture C with the curing agent to obtain a mixture D; and carrying out microwave radiation, foaming, curing, drying and quenching on the mixture D in a microwave foaming device to obtain the high-density melamine foam. The melamine foam described in the present invention has high density and high strength performance.

2 Claims, No Drawings

METHOD FOR PREPARING HIGH-PERFORMANCE MELAMINE FOAM

CROSS-REFERENCE TO RELATED APPLICATIONS

This application is a divisional application of U.S. patent application Ser. No. 15/001,243 with a filing date of Jan. 20, 2016. The content of the aforementioned application, including any intervening amendments thereto, is incorporated herein by reference.

TECHNICAL FIELD

The present invention relates to melamine foam and a preparing method thereof, and particularly to high-density melamine foam and a preparing method thereof.

BACKGROUND

The existing melamine foam is low-density and high-open-ratio flame-retardant foam, has excellent flame retardant, sound absorption, thermal insulation and cleaning functions, and can be widely applied to the construction, transportation, household and industry fields. In practical applications, some fields, such as cushion, sofa, thermal insulation, cleaning and other fields, make higher requirements for the density and strength of melamine foam, but the density of the melamine foam on the current market is generally 4 to 10 kg/m3, which is difficult to meet the requirements, thereby limiting the application fields of the melamine foam. Therefore, one important direction of research on the melamine foam is to improve the density and strength of the melamine foam.

Some reports on technologies related to the production of the melamine foam have been made at home and abroad, but rarely involve the preparing method of high-density melamine foam. For example, the invention patent with a Patent No., "ZL 200510087184.0" discloses a production method of a high-solid-content melamine resin, wherein the melamine resin is used for producing melamine foam plastics, the molar ratio of formaldehyde to melamine in the used raw materials is 2:1 to 4:1, and the solid content is 60% to 90%; the invention patent with a Patent No. "ZL 201210128145.0" discloses a preparing method of melamine formaldehyde resin for foam, the molar ratio of formaldehyde to melamine in the used raw materials is 1:1 to 4:1, the solid content is 40% to 80%, and a buffer and a stabilizer are introduced to solve the resin synthesis and stability problems. The above-mentioned patent technology proposes the preparing method of melamine foam, but the density and strength are still difficult to adapt to the higher requirements.

SUMMARY OF THE PRESENT INVENTION

The purpose of the present invention is to provide high-density melamine foam and a preparing method so as to solve the above problems.

The present invention achieves the above purpose by the following technical solution:

High-density melamine foam comprises the following raw materials in parts by weight: 0-99 parts of primary polymer of waterborne melamine formaldehyde resin, 1-100 parts of solid methylol melamine, 0-43 parts of polar solvent, 0.5-5 parts of surfactant, 1-20 parts of foaming agent, 0.1-10 parts of curing agent and 0-10 parts of additive.

Preferably, the high-density melamine foam comprises the following raw materials in parts by weight: 50-90 parts of primary polymer of waterborne melamine formaldehyde resin, 10-50 parts of solid methylol melamine, 0-10 parts of polar solvent, 1-3 parts of surfactant, 5-15 parts of foaming agent, 1-5 parts of curing and 0-5 parts of additive.

Specifically, the molar ratio of formaldehyde to melamine in the raw materials of preparing the primary polymer of the waterborne melamine formaldehyde resin is 6:1 to 1,1:1, and the solid content is 50% to 80%. The solid methylol melamine is powder or particles of methylol melamine monomer or primary polymer, or partially etherified methylol melamine, or a mixture of the previous two materials. The polar solvent is water or alcohol with a boiling point of 40° C. to 120° C. The surfactant is an anionic surfactant, a nonionic surfactant or a cationic surfactant with the functions of emulsification, dispersion and bubbling. The foaming agent is a physical foaming agent with a low boiling point or a chemical foaming agent which is easily decomposed/reacts with acid to produce gas. The curing agent is organic acid or inorganic acid. The additive is one or more of a light stabilizer, a heat stabilizer, an antiager, a formaldehyde scavenger, a colorant and a filler.

More preferably, the molar ratio of formaldehyde to melamine is 4:1 to 2:1, and the solid content is 70% to 80%. The solid methylol melamine is one or more of a monomer or primary polymer of solid trimethylol melamine, solid tetramethylol melamine, solid hexamethylol melamine, partially etherified methylol melamine and partially butylated methylol melamine. The polar solvent is desalted water or distilled water. The surfactant is one or more of aqueous or solvent-free alkyl sodium sulfonate or potassium salt, sodium alkyl benzene sultanate or potassium salt, alkyl naphthalene sulfonate, alkyl sulfate sodium salt or potassium salt, alkyl carboxylate, polyoxyethylene ether sulfate sodium salt or potassium salt, alkyl olefin sulfonate, polyoxyethylene ether, alkanolamide, amine oxide, a silicon surfactant and a fluorocarbon surfactant. The physical foaming agent is one or more of alkane, halohydrocarbon, alcohol, ether, ester and ketone with the low boiling point. The chemical foaming agent is one or more of carbonate or bicarbonate, azodicarbamide, isocyanate and ammonium chloride. The organic acid is one or more of acetic acid, propanoic acid, oxalic acid, citric acid, palmitic acid, benzoic acid, sulfamic acid and glutemic acid. The inorganic acid is one or more of hydrochloric acid, phosphoric acid, sulfuric acid, nitric acid, sulfurous acid, pyrophosphoric acid and boric acid.

A preparing method of the high-density melamine foam comprises the following steps:

1) Preparing a primary polymer of waterborne melamine formaldehyde resin;

(2) Uniformly mixing the primary polymer of the waterborne melamine formaldehyde resin, the polar solvent, the surfactant and the additive in a thermostatic mixing tank proportionally to obtain a mixture A;

(3) Uniformly mixing the mixture A with the solid methylol melamine in a thermostatic single screw extruder or twin-screw extruder proportionally to obtain a mixture B;

(4) Uniformly mixing the mixture B with the foaming agent in the twin-screw extruder proportionally to obtain a mixture C;

(5) Uniformly mixing the mixture C with the curing agent in a thermostatic high-speed mixer proportionally to obtain a mixture D;

(6) foaming, curing and drying the mixture D by using microwave radiation and quenching the mixture D in a microwave foaming device to obtain the high-density melamine foam.

Preferably, the solid content of the mixture B in Step (3) is 70% to

More preferably, the mixing rotating speed of Steps (2), (3) and (4) is 100 r/min to 500 min; the mixing rotating speed of Step (5) is 500 r/min to 3000 r/min; the material temperature of the mixture A, the mixture B and the mixture C is 20° C. to 40° C.; the material temperature of the mixture D is 10° C. to 30° C.; and the microwave radiation power in Step (6) is 1 kW/kg to 10 kW/kg, the radiation foaming time is 1 min to 20 in, the drying temperature is 150° C. to 250° C. and the drying time is 10 min to 60 min.

The present invention has beneficial effects follows:

According to the present invention, the melamine foam is prepared by taking the primary polymer of the waterborne melamine formaldehyde resin and the solid methylol melamine as basic materials, thereby increasing the molecular weight and functionality of the resin, increasing the solid content, and achieving the purpose of improving the density and strength of the melamine foam. The high-density melamine foam of the present invention can be widely used for thermal insulation, sound insulation and decoration of a building field; noise reduction, thermal insulation and buffering of a traffic and transportation field; heat insulation, cold insulation and noise reduction of equipment and pipes in an industrial field; and cleaning, a sanitary belt and a gasket of a civil field; and especially applicable to the fields, such as a seat cushion, a sofa, thermal insulation, cleaning and the like.

DETAILED DESCRIPTION OF EMBODIMENTS

The parts by weight of the components in the high-density melamine foam of the present invention are changed greatly, and the specific parameters in a preparing process can also be changed, therefore, many embodiments of the present invention are presented, and cannot be exhaustive at all; and the present invention is further described below in combination with three specific embodiments, but undoubtedly, the three embodiments do not limit the technical solution of the present invention.

Embodiment 1

The high-density melamine foam is prepared according to the following steps:

(1) Preparing 3200 g of primary polymer of waterborne melamine formaldehyde resin according to a conventional method, wherein the solid content of the waterborne melamine formaldehyde resin is 75%, and the molar ratio of formaldehyde to melamine in raw materials for preparing the waterborne melamine formaldehyde resin is 3:1;

(2) Uniformly mixing the primary polymer of the waterborne melamine formaldehyde resin with 80 g of alkylphenol ethoxylates (OP-10 for short) and 8 g of dicyandiamide in a thermostatic mixing tank to obtain a mixture A, wherein the stirring rotating speed 250 r/min, and the temperature of the mixture A is 30° C.;

(3) Transferring the mixture A and 800 g of tetramethylol melamine to a thermostatic twin-screw extruder through a metering transfer pump and a metering feeder respectively to uniformly mix to obtain a mixture B, wherein the mixing rotating speed is 150 r/min, and the temperature of the mixture B is 30° C.;

(4) After extruding the mixture B from the twin-screw extruder, sending the same to another twin-screw extruder to uniformly mix with 400 g of trichlorotrifluoroethane sent to the twin-screw extruder through a metering pump to obtain a mixture C, wherein the mixing rotating speed is 180 r/min and the temperature of the mixture C is 25° C.;

(5) After extruding the mixture C from the twin-screw extruder, sending the same to a high-speed mixer to uniformly mix with 120 g of benzoic acid sent to the high-speed mixer through the metering pump at a constant temperature obtain a mixture D, wherein the r fixing rotating speed is 2000 r/min, and the temperature of the mixture 0 is 20° C.;

(6) foaming, curing and drying the mixture D by using microwave radiation and quenching the mixture D in a microwave foaming device to obtain the high-density melamine foam, wherein the microwave radiation power for the mixture 0 is 6.3 kW/kg, the radiation time is 3 min, the drying temperature is 220° C., and the drying time is 20 min, The density of the high-density melamine foam prepared with the above method is 14.3 kg/m3, the tensile strength is 170.0 kpa and the elongation at break is Embodiment 2

The high-density melamine foam is prepared according to the following steps:

(1) Preparing 2000 g of primary polymer of waterborne melamine formaldehyde resin according to a conventional method, wherein the solid content of the waterborne melamine formaldehyde resin is 78%, and the molar ratio of formaldehyde to melamine in raw materials for preparing the waterborne melamine formaldehyde resin is 3:1;

(2) Uniformly mixing the primary polymer of the waterborne melamine formaldehyde resin with 188 g of desalted water, 120 g of sodium lauryl polyoxyethylene ether sulfate (AES for short) and 20 g of talcum powder in a thermostatic mixing tank to obtain a mixture A, wherein the stirring rotating speed is 250 r/min, and the temperature of the mixture A is 30° C.;

(3) Transferring the mixture A and 2000 g of tetramethylol melamine to a thermostatic twin-screw extruder through a metering transfer pump and a metering feeder respectively to uniformly mix to obtain a mixture B, wherein the mixing rotating speed is 150 r/min, and the temperature of the mixture B is 28° C., (4) After extruding the mixture B from the twin-screw extruder, sending the same to another twin-screw extruder to uniformly mix with 480 g of cyclopentane sent to the twin-screw extruder through a metering pump to obtain a mixture C, wherein the mixing rotating speed is 180 r/min, and the temperature of the mixture C is 24° C.; (5) After extruding the mixture C from the twin-screw extruder, sending the same to a high-speed mixer to uniformly mix with 140 g of oxalic acid sent to the high-speed mixer through the metering pump at a constant temperature to obtain a mixture D, wherein the mixing rotating speed is 1500 r/min, and the temperature of the mixture 0 is 21° C.;

(6) foaming, curing and drying the mixture D by using microwave radiation and quenching the mixture D in a microwave foaming device to obtain the high-density melamine foam, wherein the microwave radiation power for the mixture D is 3.6 kW/kg, the radiation time is 8 min, the drying temperature is 180° C., and the drying time is 40 min The density of the high-density melamine foam prepared with the above method is 22.0 kg/m3, the tensile strength is 180.9 kpa, and the elongation at break is 13.6%.

Embodiment 3

The high-density melamine foam is prepared according to the following steps:

(1) Preparing 2000 g of primary polymer of waterborne melamine formaldehyde resin according to a conventional method, wherein the solid content of the waterborne melamine formaldehyde resin is 73%, and the molar ratio of formaldehyde to melamine in raw materials for preparing the waterborne melamine formaldehyde resin is 2:1;

(2) Uniformly mixing the primary polymer of the waterborne melamine formaldehyde resin with 68 g of ethyl alcohol, 80 g of sodium dodecyl sulfate, 40 g of dodecyl polyethenoxy ether, 8 g of dicyandiamide and 20 g of talcum powder in a thermostatic mixing tank to obtain a mixture A, wherein the stirring rotating speed is 250 r/min, and the temperature of the mixture A is 33° C.;

(3) Transferring the mixture A with 1000 g of tetramethylol melamine and 1000 g of hexamethylol melamine which are pre-mixed to a thermostatic twin-screw extruder through a metering transfer pump and a metering feeder respectively to uniformly mix to obtain a mixture B, wherein the mixing rotating speed is 150 r/min, and the temperature of the mixture B is 28° C.; (4) After extruding the mixture B from the twin-screw extruder, sending the same to another twin-screw extruder to uniformly mix with 400 g of petroleum ether sent to the twin-screw extruder through a metering pump to obtain a mixture C, wherein the mixing rotating speed is 160 r/min, and the temperature of the mixture C is 26° C.;

(5) After extruding the mixture C from the twin-screw extruder, sending the same to a high-speed mixer to uniformly mix with 200 g of benzoic acid sent to the high-speed mixer through the metering pump at a constant temperature to obtain a mixture D, wherein the mixing rotating speed is 1800 r/mm, and the temperature of the mixture 0 is 23° C.;

(6) foaming, curing and drying the mixture D by using microwave radiation and quenching the mixture D in a microwave foaming device to obtain the high-density melamine foam, wherein the microwave radiation power for the mixture D is 4.5 kW/kg, the radiation time is 5 min, the drying temperature is 200° C., and the drying time is 30 min.

The density of the high-density melamine foam prepared with the above method is 18.1 kg/m3, the tensile strength is 166.0 kpa and the elongation at break is 17.3%.

The above embodiments are just the preferred embodiments of the present invention, not limitation to the technical solution of the present invention. Technical solutions which can be achieved on the basis of the above embodiments without creative labor shall be considered to fall into the protection scope of claims of the patent of the present invention.

What is claimed is:

1. A method for preparing a melamine foam, comprising the following steps:
   a. preparing a primary polymer of waterborne melamine formaldehyde resin;
   b. uniformly mixing the primary polymer of the waterborne melamine formaldehyde resin, a polar solvent, a surfactant and an additive in a thermostatic mixing tank by rotation to obtain a mixture A;
   c. transferring the mixture A and solid methylol melamine through a metering transfer pump and a metering feeder, respectively to a first thermostatic single screw extruder or twin-screw extruder and uniformly mixing the mixture A and the solid methylol melamine to obtain a mixture B;
   d. transferring the mixture B to a second thermostatic single screw extruder or twin-screw extruder and uniformly nixing the mixture B with a foaming agent to obtain a mixture C;
   e. transferring the mixture C to a thermostatic high-speed mixer from the second thermostatic single screw extruder or twin-screw extruder, and uniformly mixing the mixture C with a curing agent in the thermostatic high-speed mixer to obtain a mixture D; and
   f. foaming, curing and drying the mixture D by using microwave radiation and quenching the mixture D in a microwave foaming device to obtain the melamine foam;
   wherein a solid content of the mixture B in step c is 70% to 99%.

2. The method for preparing the melamine foam according to claim 1, wherein a mixing rotating speed of step b, step c and step d is 100 r/min to 500 r/min, and a mixing rotating speed of step e is 500 r/min to 3000 r/min;
   a material temperature of the mixture A, the mixture B and the mixture C is 26° C. to 40° C., and a material temperature of the mixture D is 10° C. to 30° C.; and
   microwave radiation power in step f is 1 to 10 kW per kilogram of mixture D, radiation foaming time is 1 min to 20 min, a drying temperature is 150° C. to 250° C. and drying time is 10 min to 60 min.

* * * * *

UNITED STATES PATENT AND TRADEMARK OFFICE
CERTIFICATE OF CORRECTION

PATENT NO. : 9,994,689 B2  
APPLICATION NO. : 15/681324  
DATED : June 12, 2018  
INVENTOR(S) : Rui Ye et al.

Page 1 of 1

It is certified that error appears in the above-identified patent and that said Letters Patent is hereby corrected as shown below:

On the Title Page

Item (71) should read:  
"CHENGDU YULONG CHEMICAL CO., LTD." of Chengdu, China  
"RUI YE" of Chengdu, China  
"LU ZHANG" of Chengdu, China Signed and Sealed this  
Nineteenth Day of February, 2019

Andrei Iancu  
*Director of the United States Patent and Trademark Office*